March 6, 1951      J. A. V. BENARD      2,544,250
METHOD OF MOUNTING AND LOCKING OPTICAL
LENSES IN A HOUSING
Filed May 15, 1947
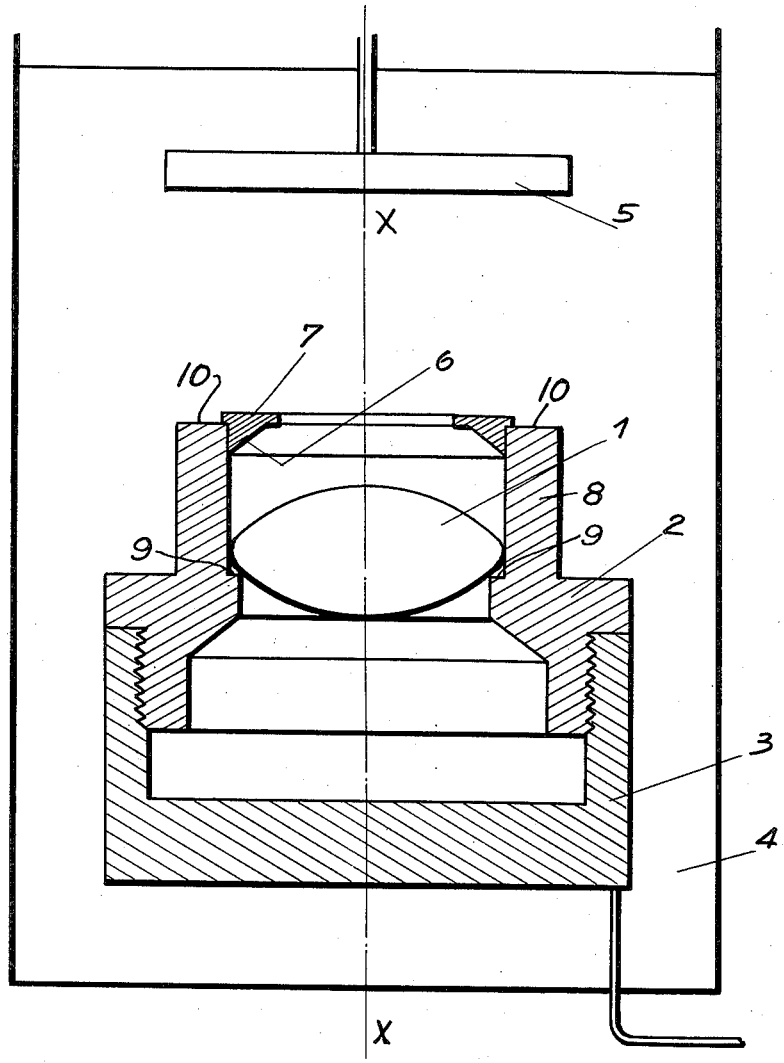
Inventor
Jacques A. V. Benard
by Wilkinson & Mawhinney
Attorneys Patented Mar. 6, 1951

2,544,250

UNITED STATES PATENT OFFICE 2,544,250

METHOD OF MOUNTING AND LOCKING OPTICAL LENSES IN A HOUSING

Jacques Alfred Victor Benard, Paris, France, assignor to Anciens Etablissements Barbier, Benard & Turenne, Paris, France, a joint-stock company of France Application May 15, 1947, Serial No. 748,324
In France May 27, 1946

2 Claims. (Cl. 204—16)

In precision optical instruments such as field-glasses, microscopes, the optical systems (lenses, prisms) have to be adjusted in the mechanical parts of the instruments so as to obtain the accurate centring and the correct position of said systems. This adjusting operation, which is effected optically by means of checking devices which are variable according to the cases, is followed by a final locking operation which is intended to fix the optical systems in the correct position in which they have been placed during the adjusting operation.

This locking is in most cases effected by setting or crimping, or by cementing.

The setting operation is in principle confined to optical systems of revolution (objectives and eye-pieces of microscopes or of field-glasses and telescopes), cementing being used more for fixing "shaped" optical parts such as prisms.

Both these operations have certain drawbacks.

Cementing requires special precautions if it is desired to avoid, either the untimely unsticking of the parts by the effect of temperature or of shocks, or the ageing of the product used for cementing, such ageing being liable to produce either a yellowing that may affect the transparency of the optical system at the edges, or the scaling of the cement which causes a deposit of fine particles of said cement to form on the lenses, thereby blurring the vision through the instrument. If the cement is a hygrometric product, the "breathing" phenomena of the instrument eventually cause the optical part to become unstuck and throw the instrument out of adjustment; at the same time, some products used for cementing may in the end attack the glass.

As regards setting, this is a reliable and stable mechanical operation which ensures the locking of the optical system in its correct position, but it requires particular precautions if it is desired to avoid, either producing internal tensions in the optical system, which tensions may make the instrument useless owing to deformation of the paths of the light rays, or throwing the system out of centre during the setting operation.

In any case, setting is a delicate operation requiring a difficult knack and it always leads to a considerable number of rejections at the final checking.

The present invention relates to a method which has none of the drawbacks hereinbefore referred to and which enables the optical systems to be locked in the instruments in a reliable and simple manner.

The method according to the invention is essentially characterised by the fact that this locking is obtained by means of a deposit, effected by electrolytic means, of metal or other adequate products on the contacting parts of the optical members and the mechanical members. To some extent an electrolytic setting of the optical systems in the instruments is obtained.

In order to carry out the method according to the invention, the optical member to be mounted is placed by optical checking in its correct position in the mechanical member and the assembly thus adjusted is placed in a bath of suitable composition according to the nature of the mechanical member.

If necessary, protection is effected beforehand, by one of the usually known means, of certain parts of the members where no deposit is to be effected.

Similarly, if necessary, in order to facilitate manipulation without special precautions, the optical member may be temporarily locked in its correct position after adjustment, by depositing a temporary cement (for example paraffin, celluloid, rubber, etc.) which is so chosen that its deposit is effected without producing movements or creating stresses and that its subsequent removal, after final fixing according to the invention, can be readily obtained.

These preparatory and ancillary precautions having been completed and the assembly comprising the optical system and the mechanical member in which it is to be locked having been immersed in the setting bath, the metal displaced, by electrolytic means, towards the mechanical member of the instrument is deposited between said member and the optical system in successive layers.

An embodiment of mounting and locking by electrolytic means an optical system in a mechanical member of an instrument will now be described in a purely explanatory and non-limitative manner, reference being had to the accompanying drawing.

In this drawing, 1 designates an optical member, for example a lens, which it is required to fix in a mechanical member 2. For this purpose, said mechanical member is fixed in a second member 3 which is closed at its lower end and forms a cathode. The assembly is placed in an electrolytic tank 4 provided with an anode 5, made of copper for example, which tank is filled with an appropriate alkaline or acid bath according to the results which it is desired to obtain. The cathode is so arranged that the axis X—X of the mechanical member is absolutely vertical and the optical member 1 assumes, by the effect of gravity, exactly the position which it should finally occupy in the member 2. The member 2 is provided with an upstanding annular flange 8 or cylindrical housing for receiving therein a complementally formed lens 1. The member 2 is provided with a shoulder 9 upon which the lens 1 rests when the lens is placed within the area defined by the annular flange 8 prior to commencement of the electrolytic transfer. The upper portion of lens 1 is provided with the chamfer 6 about its periphery. In the form of the invention illustrated in the drawing the plane of the surface of the lens adjacent the anode 5 is flat and is substantially co-planar with the upper free ends 10 of the flange 8 of the mechanical member 2.

It should be noted that the lens is provided with a chamfer 6 so as to form a circular cavity in which is deposited in successive layers the metal displaced by electrolytic means which thus forms a setting 7, or deposit on the adjacent face end 10 of the housing and holds the optical member accurately in position owing to the fact that it closely follows the minutest cavities produced by grinding the chamfer 6 with emery.

It is quite obvious that the outer periphery of the mechanical member 2 and that of the cathode 3 are covered with an appropriate coating, for example comprising polyvinyl resins, which prevents any metal deposit from forming outside the circular cavity.

Once the setting by electrolysis has been completed, it is only necessary to trim it by any suitable means.

It will be understood that the deposit obtained obviously cannot produce any movement of the optical system in the member since it is a static deposit; therefore any risk of throwing said system out of adjustment is eliminated.

For the same reason, said deposit cannot create any pressure on the members, thereby eliminating any risk of internal strains in the optical system.

The setting thus obtained can furthermore be effected by mass production methods in prepared baths with a remarkable time saving and ease.

It is completely automatic and independent of the manual skill of the setters.

If the mechanical members are not suitable for direct deposit, it is only necessary to deposit beforehand at the desired spots, a suitable coating, for example a conducting coating (graphite, silvering, etc.) which will ensure the deposit and the bond between the members to be secured to one another.

It is moreover obvious that the invention has only been hereinbefore described in an explanatory and in no way limitative manner and that modifications of detail may be made therein without exceeding its spirit.

I claim:

1. The method of mounting and locking optical lenses in a mechanical part having a cylindrical housing with an internal shoulder within said housing upon which the lens is adapted to seat consisting of chamfering the edge of the optical lens about the periphery of the end of said lens remote from the end adapted to seat upon said shoulder, placing said optical lens in said housing with the free end of said housing out of contact with the chamfered portion and the opposite end of said lens resting upon the shoulder within said housing, immersing said mechanical part with said lens therein in an electroplating bath having an anode therein, and passing an electric current through the bath using the mechanical part as a cathode to produce an electrolytic metal deposit which strongly adheres to the free end portion of said housing adjacent said chamfer and which progressively covers the chamfered portion of the optical lens thereby locking the same in position within the housing.

2. The method of mounting and locking an optical lens in a mechanical part as claimed in claim 1 further comprising the step of initially setting the optical lens in the mechanical part and retaining the same therein prior to the immersion thereof in the galvanoplastic bath by cementing.

JACQUES ALFRED VICTOR BENARD.

REFERENCES CITED

The following references are of record in the file of this patent:

UNITED STATES PATENTS

| Number | Name | Date |
|---|---|---|
| 227,370 | Man | May 11, 1880 |
| 299,055 | Collins | May 20, 1884 |
| 1,283,573 | Schmidt | Nov. 5, 1918 |
| 2,075,477 | Smith | Mar. 30, 1937 |

FOREIGN PATENTS

| Number | Country | Date |
|---|---|---|
| 602,485 | France | Dec. 28, 1925 |